March 20, 1973   R. D. APPLEGATE   3,721,179
CHEMICAL APPLICATOR FOR GRAIN
Filed Aug. 20, 1971   4 Sheets-Sheet 1

INVENTOR.
ROBERT D. APPLEGATE
BY
Woodard, Weikart, Emhardt & Naughton
ATTORNEYS

March 20, 1973    R. D. APPLEGATE    3,721,179
CHEMICAL APPLICATOR FOR GRAIN
Filed Aug. 20, 1971    4 Sheets-Sheet 2

INVENTOR.
ROBERT D. APPLEGATE
BY
Woodard, Weikart, Emhardt & Naughton
ATTORNEYS

March 20, 1973 R. D. APPLEGATE 3,721,179
CHEMICAL APPLICATOR FOR GRAIN
Filed Aug. 20, 1971 4 Sheets-Sheet 3

INVENTOR.
ROBERT D. APPLEGATE
BY
Woodard, Weikart, Emhardt & Naughton
ATTORNEYS

INVENTOR.
ROBERT D. APPLEGATE

United States Patent Office 3,721,179
Patented Mar. 20, 1973

3,721,179
CHEMICAL APPLICATOR FOR GRAIN
Robert D. Applegate, Attica, Ind., assignor to
Driall Driers, Inc.
Filed Aug. 20, 1971, Ser. No. 173,449
Int. Cl. A23b 9/00
U.S. Cl. 99—487
12 Claims

ABSTRACT OF THE DISCLOSURE

Disclosed is an applicator for applying liquid preservatives to grain as it is moved by an auger conveyor from a receiving bin; a switch, responsive to the grain level in the receiving bin, assures that operation of the auger conveyor and flow of the liquid preservatives can occur only when the grain level in the receiving bin is above the intake end of the auger conveyor thus providing a seal preventing discharge of the liquid or its fumes into the atmosphere.

BACKGROUND OF THE INVENTION

The most widely used method of storing grain requires that the harvested grain (corn or barley, for example) be dryed to a moisture content of the order of 14%. This suppresses or retards bacterial action in the stored grain but requires somewhat expensive equipment. Further, for maximum efficiency dryed grain normally requires re-wetting before it is used as feed and this further increases the cost of the grain drying method. An alternative to this method has been that of sealed storage of grain which has not had its moisture content lowered by drying. This method is based on the premise that restricting the amount of oxygen in the storage chamber will sufficiently inhibit bacterial action and mold growth even though the grain has not had its moisture content reduced by drying.

In the practise of this sealed-storage method, it is difficult to maintain an effective seal, and when grain is removed, air can enter the storage chamber or silo which permits some mold growth. Additionally, when the grain is removed from such storage, it tends to deteriorate quite rapidly, particularly in warm weather. The sealed storage apparatus also is relatively expensive.

A relatively recent development in this field is the use of preservatives sprayed or otherwise applied to grain, which has not had its moisture content reduced by drying. Such treated grain can be stored in almost any kind of unsealed storage facility, such as bins, sheds or silos, the only requirement being that the stored grain is protected from snow and rain. Conventionally, the preservative liquid utilized is a mixture of acetic acid and propionic acid and functions to kill mold and bacteria when sprayed on moist grain and suppresses later mold and bacteria growth. Moist grain can be stored, after treatment, for at least 12 months without the necessity of using sealed containers or refrigeration.

The chemicals (such as glacial acetic acid) sprayed on the grain in the process referred to above, are dangerous to those in the area near the apparatus and normally require such precautions as use of goggles, protective rubber clothing, etc. The apparatus of the present invention permits the effective application of chemicals to grain or the like without the danger of discharge of the chemicals or their fumes into the adjacent atmosphere.

DESCRIPTION OF THE PREFERRED EMBODIMENTS

Figure 1:
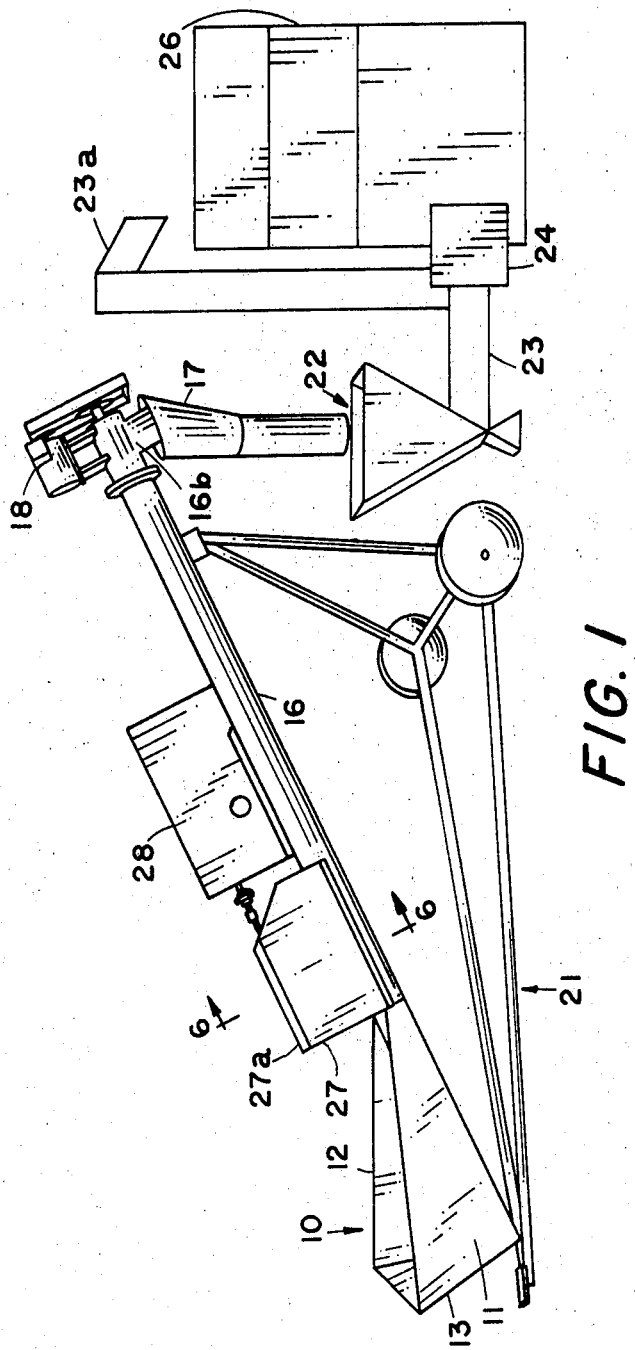
FIG. 1 is a perspective view of apparatus embodying the present invention.

Referring initially to FIG. 1, applicator apparatus embodying the present invention is illustrated as including a grain accommodating member taking the form of a receiving bin, indicated generally at 10, and having sidewalls 11 and 12, together with an end wall 13. A grain conveying element, taking the form of the auger tube 16, has its intake end (indicated generally at 16a in FIG. 2) extending into the bin 10 and extends, inclined in attitude, to a discharge chute 17 which is attached to and extends from the discharge end 16b of the auger. An electric motor 18, connected by a suitable belt and pulley, functions to rotate the auger screw 19 (FIG. 2) which extends within the auger tube 16. The auger assembly functions in conventional fashion to transport grain from the receiving bin 10 to the discharge chute 17. A wheeled frame 21 supports the applicator assembly.

The discharge chute 17 is adapted to empty into a bin 22 and the grain is removed from the bin 22 by a conventional conveyor or auger indicated at 23. The auxiliary conveyor thus provided is driven by an electric motor and functions to discharge grain from its upper end 23a into any suitable accumulating, storage facility such as the bin 26. A nozzle assembly housing 27, having a removable closure 27a, is positioned on the auger 16 together with an electrical control panel 28.

Figure 2:
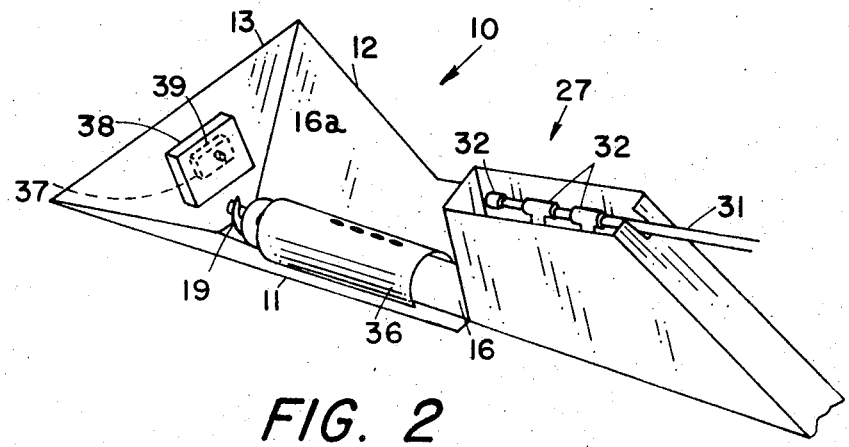
FIG. 2 is an enlarged, fragmentary, perspective view of a portion of the apparatus shown in FIG. 1.
Figure 6:
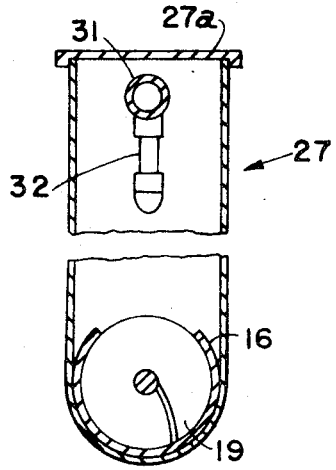
FIG. 6 is a sectional view taken generally along the line 6—6 of FIG. 1.

As may best be seen in FIG. 2, the means for spraying liquid chemicals on the grain moving through the auger includes a pipe 31 which extends within the housing 27 and supports a plurality of spray nozzles 32 as indicated in FIG. 6. In FIG. 2 the closure 27a for the housing 27 is removed so that the pipe 31 and the nozzles 32 will be visible, it being understood that the closure 27a is kept in place when the apparatus is in operation. As will be evident from FIG. 6, the auger tube 16 is broken away to expose within the housing 27 a portion of the auger screw 19 so as to expose the grain transported by the auger to the chemical spray issuing from the nozzles 32. The pipe 31 is connected, through a controlling solenoid valve, to a source of the chemicals which is under pressure as will subsequently be described.

Figure 5:
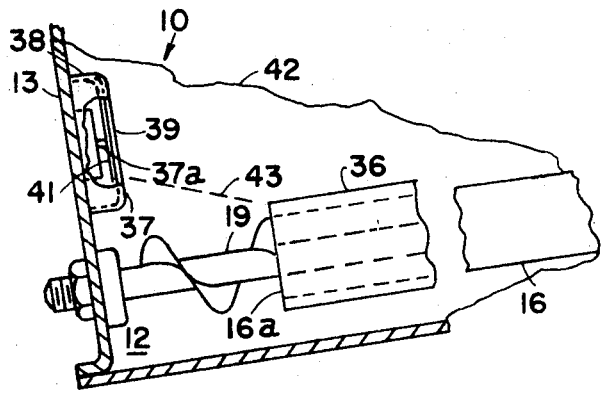
FIG. 5 is an enlarged, fragmentary view of a portion of the apparatus shown in FIG. 1.

Referring to FIGS. 2 and 5, the auger tube 16 terminates short of the end wall 13 of the bin so that a portion of the auger screw 19 is exposed to grain accumulated in the bin, this providing the inlet for the auger tube 16. The size of this inlet, and thus the rate of flow of grain from the bin, is regulated by means of a cover plate 36 which overlies and extends beyond the auger tube 16. This cover may be positioned along the auger tube so that the end of the cover may be spaced at selected distances from the end of the bin 13 thereby varying the length of the exposed portion of the auger screw 19. The cover, as may best be seen in FIG. 2, is provided with a series of apertures which are adapted to fit over abutments extending upwardly from the auger tube so that the cover may be lifted and dropped into place, the abutments extending through the apertures, and held at selected positions along the auger tube.

Within the receiving bin 10 a normally open switch 37 is mounted on the inner surface of the wall 13 of the bin. Protectively covering the switch 37 is a housing 38, one wall of which is formed by the flexible member 39, which may be formed of rubber. Extending within the housing 38 and adjacent the inner face of the flexible member 39 is a resilent metal strip 41 which engages the thrust pin 37a of the switch. When the grain level in the bin is generally at the location indicated at 42, the flexible member 39 will be pressed inwardly to actuate the switch 37 to closed position. Should the grain level fall generally to that location indicated at 43, the flexible wall 39 will be released and the switch 37 will move to open position. It will be noted that the switch 37 is located with relation to the inlet end 16a (FIG. 5) of the auger so that the critical level of grain at which the switch 37 is opened must be reached before the grain level falls sufficiently to expose the intake end of the auger.

Figure 7:
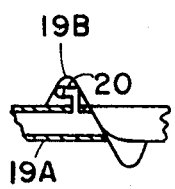
FIG. 7 is an enlarged, fragmentary view of a modified form of the apparatus of the present invention.

Referring to FIG. 7, an alternative form for applying the liquid chemicals to the grain within the auger tube is shown. In this arrangement the hollow central shaft 19a of the screw is utilized as a conduit for the liquid which, entering the shaft 19a at one of its ends (not shown), is ejected through the nozzle 20 generally toward the surface of the adjacent portion of the flutting 19b of the auger tube. While only one nozzle 20 is shown, it will be understood that a plurality of such nozzles, extending from and communicating with the interior of the auger shaft 19a might be utilized.

Figure 3:
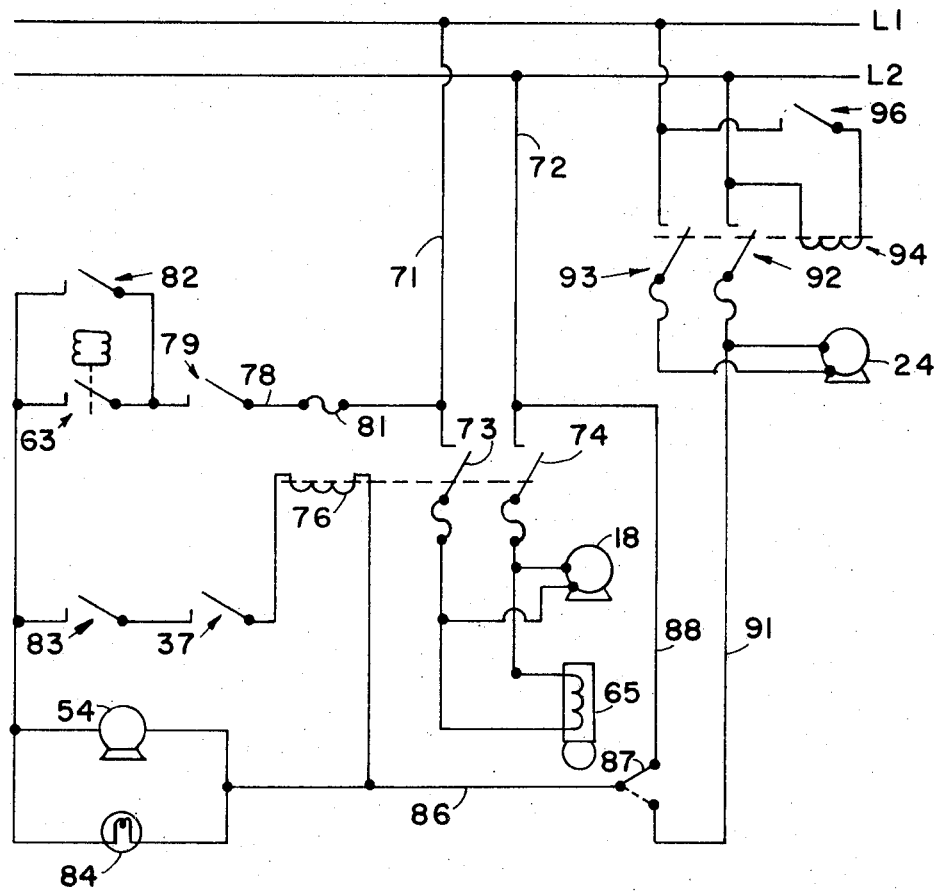
FIG. 3 is a schematic showing of the electrical circuit of the apparatus of the present invention.
Figure 4:
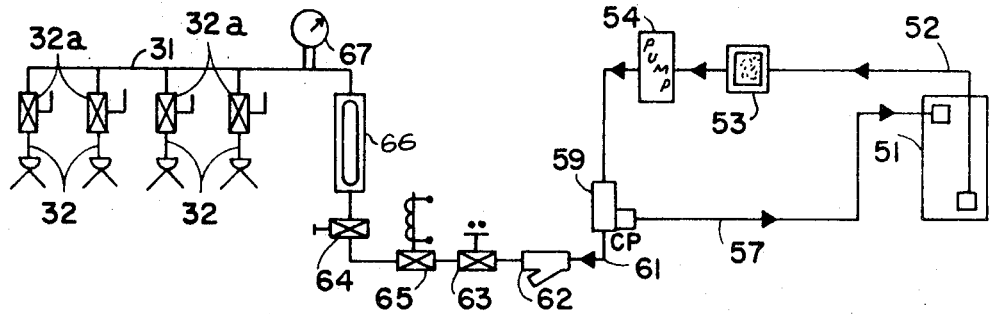
FIG. 4 is a schematic showing of the flow of liquid chemicals in the apparatus of the present invention.

Referring to FIG. 4, the flow path of the liquid chemicals applied to the grain in the auger tube will now be described. A supply of liquid chemicals is schematically indicated by the supply tank or drum 51 and the suction line leading from the drum is indicated at 52. A replaceable cartridge type filter is indicated at 53 and a pump is indicated at 54, the pump being driven by an electric motor whose electrical circuit will be described subsequently with reference to FIG. 3. The discharge line 58 from the pump extends to a pressure regulator, schematically indicated at 59 which provides a constant pressure to the line 61, the pressure regulator also having a return line 57.

A strainer 62 and a pressure switch 63, together with a solenoid valve 65 and an adjustable needle valve 64 are connected in series in the line 61 and connected to a flow meter schematically indicated at 66.

It will be understood that the manually operable needle valve 64 is utilized in adjusting the rate of flow of the chemicals by coordinating its adjustment with the indication of the flow meter 66 in conventional fashion. From the flow meter the chemicals flow to the array of nozzles 32, each of which is preferably provided with a manual cut-off valve 32a. A gage, schematically indicated at 67, provides a visual indication of the pressure of the chemicals in the line as they enter the pipe 31 to which the nozzle assemblies are attached.

Referring to FIG. 3, there is illustrated the schematic electrical diagram for the apparatus components utilizing a 115 volt AC supply system provided by the lines L1 and L2. It will be understood that with only obvious, minor wiring changes the arrangement could be utilized with a three wire, 220 volt service. Referring to FIG. 3, wires 71 and 72 connect lines L1 and L2 respectively to the fused motor starter for the auger or applicator motor 18 (previously mentioned with reference to FIG. 1). The motor starter includes switches 73 and 74 operated by the electromagnetic coil 76, closure of the switches 73 and 74 applying power to the applicator motor 18 and energizing the solenoid valve 65 (previously mentioned with reference to FIG. 4).

The wire 78 connects the manual on-off switch 79 to the line wire 71 through a fuse 81. Switch 79 is connected to pressure switch 63 (mentioned previously with respect to FIG. 4) and a manually operated priming switch 82 which provides a means for completing the energizing circuit for the pump 54. Priming switch 82, once manually closed, may be released as soon as the pressure in the liquid chemical line builds up sufficiently to actuate switch 63 to closed position. The coil 76 controlling closure of the switches 73 and 74 and, thus, energization of the applicator motor, is controlled by on-off, manually operable switch 83 which is connected in series with the bin switch 37, previously mentioned with respect to FIGS. 1 and 2. A parallel circuit branch around the coil 76 and the bin switch 37 is completed by the pump motor 54 with accompanying pressure indicator lamp 84. The circuit from the coil 76 and the pump motor 54 extends by means of wire 86, through a jumper wire 87 to wire 88 which connects to wire 72 and line wire L2. The above represents the most simple electrical configuration of the control, however, with the jumper wire 87 removed from its solid line position of FIG. 3 and installed in its broken line position, the wire 86 is then connected to wire 91 which is connected to one side of the auxiliary conveyor motor 24 (mentioned above with reference to FIG. 1) and through the relay switch 92 to the line wire L2. A further relay operated switch 93 connects the line wire L1 to the auxiliary conveyor motor 24 and the relay coil 94, when energized, closes the switches 92 and 93 to energize the auxiliary conveyor motor 24.

A manually operated switch 96 connects one side of the coil 94 to the line L1, the other side of the coil being directly connected to the line L2. Closure of switch 96 energizes relay coil 94, closing switches 92 and 93 and energizing the auxiliary conveyor motor 24. Since the circuit network including the relay coil 76 and pump motor 54, when jumper wire 87 is in its broken line position, can be energized only if switch 92 is closed (thereby providing a circuit path to line wire L2), it will be evident that operation of the pump and the applicator motor 18 and energization of solenoid valve 65 are interlocked with operation of the auxiliary conveyor 24, thus assuring that should the auxiliary conveyor 24 be stopped, by inadvertent opening of switch 96, for example, the flow of liquid chemical and the operation of the applicator motor 18 and the pump 54 would immediately terminate.

In operation, assuming the jumper wire 87 is in its broken line position of FIG. 3, the auxiliary conveyor 24 may be started by manually closing the switch 96, and the switch 79 may also be manually closed, together with the priming switch 82. This energizes the pump 54 through wire 86, jumper wire 87, wire 91 and switch 92, the line wires L1 and L2 then being connected across the pump. As soon as the pump pressure builds up the switch 63 will be closed and the priming switch 82 may be permitted to return to open position. The liquid chemicals are then under pressure in a portion of the line leading to the nozzles 32, however, the solenoid valve 65 remains closed and the motor 18 remains deenergized. The on-off switch 83 may then be closed and grain to be treated deposited in the receiving bin. As the grain level accumulated in the bin covers the intake end of the auger 16, that is, as the grain level approaches that indicated at 42 in FIG. 5, the switch 37 will be closed and, as will be evident from FIG. 3, this energizes the relay starter coil 76, closing switches 73 and 74 thereby energizing motor 18 to start operation of the auger and opening the solenoid valve 65 to permit the flow of liquid chemical to the nozzles 32.

The application of liquid chemical to the grain moving in the auger tube may then proceed, but, it should be noted, this operation can continue only so long as the grain level in the receiving bin 10 remains above the intake end of the auger 16. When the jumper wire 87 is in its solid line position of FIG. 3, the alternate electrical control configuration thus provided permits the same operating sequence of the apparatus but, as will be evident, the operation of the auxiliary conveyor 24 is isolated from the operation of the chemical applying apparatus.

Figure 8:
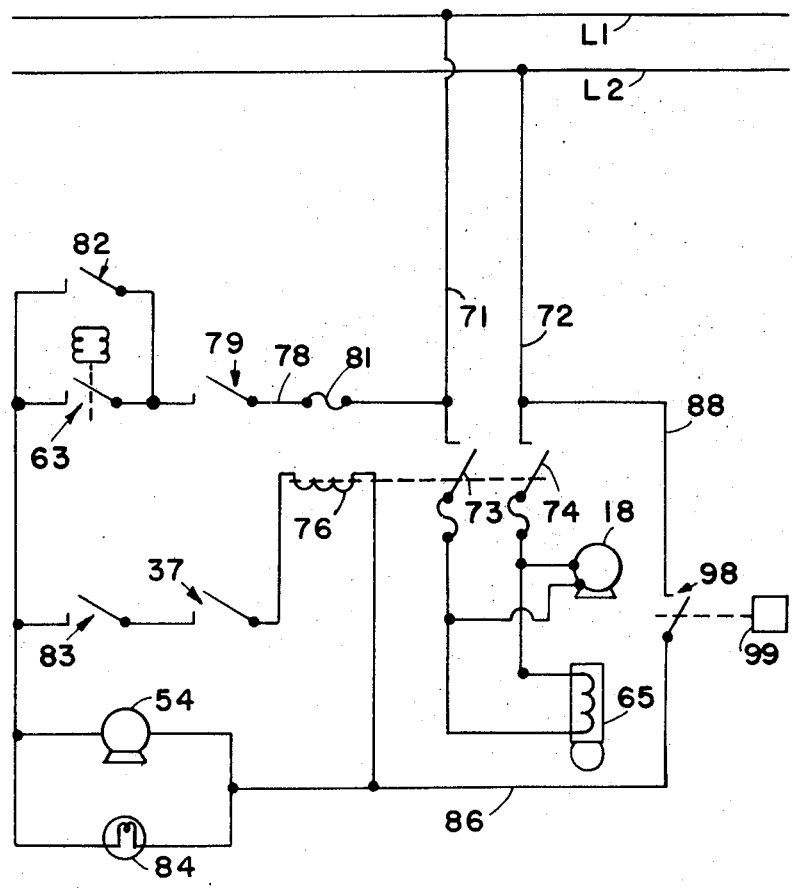
FIG. 8 is a schematic wiring diagram similar to FIG. 3 but illustrating a modified form of the invention.

The interlock between the auxiliary conveyor 24 and the chemical applicator apparatus, provided by jumper wire 87 in its broken line position of FIG. 3, is satisfactory where the auxiliary conveyor is powered by an adjacent power source such as the electrical supply lines L1 and L2. Where the auxiliary conveyor is powered by an independent power source, such as a gasoline engine, an interlock of the type illustrated in FIG. 8 may be utilized. Circuit elements common to FIGS. 3 and 8 are given the same reference numerals as in FIG. 3, and FIG. 8 differs from FIG. 3 in that the auxiliary conveyor is not shown and the switch 98 is present in FIG. 8 while jumper wire 87 has been eliminated. As will be evident from FIG. 8, energization of the auger motor 18, pump motor 54 and opening of solenoid valve 65 all depend upon closure of switch 98. Switch 98 is operated by any means, schematically indicated at 99, which is responsive to proper operation of the auxiliary conveyor. An example of such conveyor operation responsive means might take the form of a mechanical element actuated or tripped upon operating movement of the auxiliary conveyor or a relay operator coil energized by an electrical switch closed only when the auxiliary conveyor is operating. The switch 98, closed only when the auxiliary conveyor is operating and available to move treated grain, thus provides an interlock assuring that the applicator apparatus can operate only when the auxiliary conveyor is operating.

I claim:

1. An apparatus for applying liquid chemicals to grain or the like comprising a grain transporting auger including an auger tube and a rotatable auger screw within the tube, a motor for rotating the auger screw, a receiving bin accommodating the intake end of said auger for receiving grain, said auger screw when rotated moving grain in said receiving bin through said auger tube to the discharge end of said auger, means for spraying liquid chemicals on the grain moving through said auger and in an area upstream of said intake end of the auger, an electrically-energized control valve controlling the flow of liquid chemicals to said spraying means, and a monitoring switch mounted adjacent said auger intake end, said switch being responsive to the grain level in said receiving bin to de-energize said auger screw rotating motor and to close said control valve prior to a fall in said grain level sufficient to expose the intake end of said auger, thereby assuring that fumes from the liquid chemicals sprayed on the grain cannot leak through the auger intake end into the surrounding atmosphere.

2. An apparatus as claimed in claim 1 in which said spraying means includes an array of nozzles aligned above and along the rotational axis of said auger screw, said auger tube being opened adjacent said nozzles to expose grain moving within said tube to spray from said nozzles.

3. An apparatus as claimed in claim 2 in which a housing encloses said array of nozzles and said open portion of the auger tube.

4. An apparatus as claimed in claim 1 in which said spraying means includes a nozzle extending radially from the central axis of said auger screw.

5. An apparatus as claimed in claim 1 in which said monitoring switch includes a member movable in response to the pressure of grain accumulated in said receiving bin.

6. An apparatus as claimed in claim 5 in which said monitoring switch is mounted within said receiving bin adjacent to but above said auger intake end.

7. An apparatus for applying liquid chemicals to grain or the like including, a grain receiving bin adapted to receive grain to be treated, a grain-transporting motor-operated element having an intake end disposed within said bin for removing grain therefrom, means for applying liquid chemicals to the grain removed from said bin by said grain-transporting element, an electrical monitoring member responsive to the grain level in said receiving bin and mounted adjacent said element intake end, an electrical circuit interconnecting said monitoring member said motor-operated grain-transporting element and said chemical applying means to halt operation of said grain-transport element and of said chemical applying means prior to a fall in the grain level in said receiving bin sufficient to expose the intake end of said grain-transporting element.

8. An apparatus as claimed in claim 7 in which said monitoring member takes the form of a switch mounted within said receiving bin and having an actuating member moved by grain accumulated in said bin.

9. An apparatus as claimed in claim 7 but provided with an additional auxiliary grain-transporting conveyor for receiving treated grain from said grain-transporting element, an electrical motor for operating said auxiliary conveyor, and additional electrical circuit means between said first mentioned electrical circuit and said auxiliary conveyor motor to assure that operation of said grain-transporting element and of said chemical applying means can only occur when said auxiliary conveyor motor is energized.

10. An apparatus as claimed in claim 7 in which said chemical applying means includes a series of nozzles directed toward the grain being moved by said grain-transporting element.

11. An apparatus as claimed in claim 7 but provided with an additional auxiliary grain-transporting conveyor for receiving treated grain from said grain transporting element, power means for operating said auxiliary conveyor, and an interlock switch in said electrical circuit responsive to operation of said auxiliary conveyor by said power means, said interlock switch permitting energization of said electrical circuit only when said auxiliary conveyor is in operation.

12. An apparatus for applying liquid chemicals to grain or the like including, a grain accommodating member adapted to receive grain to be treated, a grain-transporting motor-operated element having an intake end in communication with said grain accommodating member, means for applying liquid chemicals to the grain removed from said grain accommodating member by said grain transporting element, an electrical monitoring member responsive to the presence of grain in said grain accommodating member, an electrical circuit interconnecting said monitoring member said motor-operated grain-transporting element and said chemical applying means to halt operation of said grain-transporting element and of said chemical applying means when a predetermined amount of grain is not present in said grain accommodating member.

References Cited
UNITED STATES PATENTS

| | | | |
|---|---|---|---|
| 995,598 | 6/1911 | Hayes et al. | 99—263 |
| 1,429,679 | 9/1922 | Hieber | 99—234 R UX |
| 2,241,425 | 5/1941 | Schmidt | 99—235 R UX |
| 2,982,319 | 5/1961 | Magnuson | 99—234 R X |
| 3,263,592 | 8/1966 | Hickey et al. | 99—235 R |
| 3,288,052 | 11/1966 | Hough | 99—235 R |

ROBERT W. JENKINS, Primary Examiner

A. O. HENDERSON, Assistant Examiner

U.S. Cl. X.R.

99—2 R, 18, 488